Dec. 5, 1933.   J. D. CAMPBELL   1,938,415
TONG CHAIN SPLICER
Filed Oct. 8, 1929
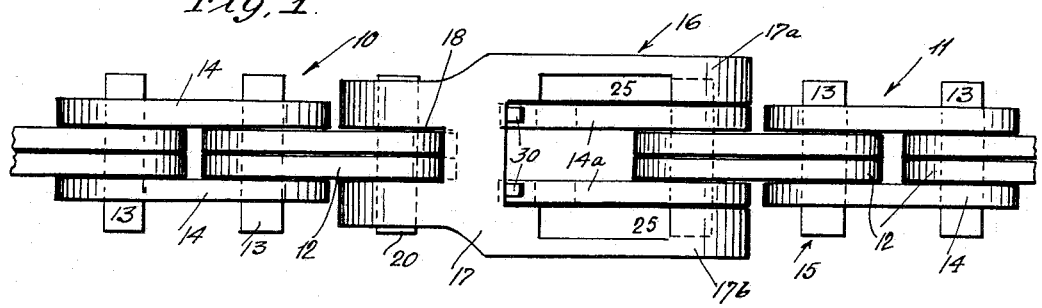
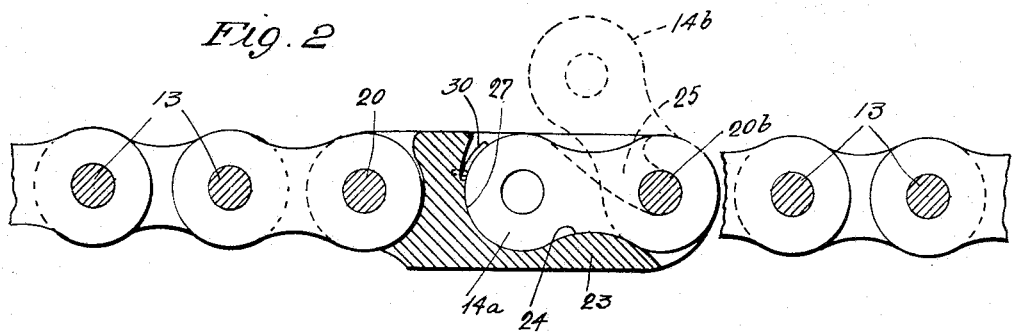
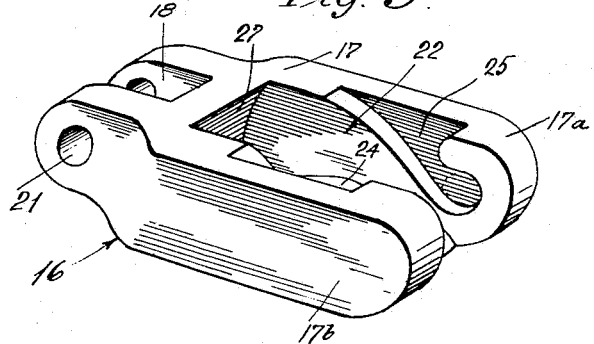
Inventor
John D. Campbell
Attorney.

Patented Dec. 5, 1933

1,938,415

UNITED STATES PATENT OFFICE 1,938,415

TONG CHAIN SPLICER

John D. Campbell, Tustin, Calif., assignor to Jay-Dee Manufacturing Co., Ltd., Tustin, Calif., a corporation of California Application October 8, 1929. Serial No. 398,258

4 Claims. (Cl. 74—49)

My invention has reference to devices for interconnecting chain lengths, and is particularly concerned with a splicer for chains of the projecting pin type. The invention finds its present and most general utility for splicing tong chains commonly used in oil well drilling operations and having flat links connected by projecting pins, and the invention therefore will hereinafter be described as applied to this use, although it will be understood that the present device may be employed for splicing other chains of this type as well.

The purpose of the invention is to provide a connecting device whereby an extra length of chain may be quickly attached to the chain on the tongs, or for quickly splicing the tong chain should it become broken. The present type of splicer in its preferred form may be described generally as comprising essentially a link adapted to be attached to one of the chain sections, and shaped to provide a socket within which the end projecting pins of the other chain section may be inserted to interconnect that section with the link. The splicer is formed most conveniently as a link clevis, the sides of which are grooved interiorly to take the projecting ends of the link pin, and the grooves being so formed that the only operations required to connect and disconnect the chain sections are those of inserting and backing the pins out of their retaining grooves. Provision is made for securing the pin against removal from the splicer when the chain is in use, preferably by confining within the splicer body the end links of the attached chain section in a manner such as to resist backing out movement of the pin within the grooves, as will be hereinafter explained.

The invention will be understood more fully and clearly from the following detailed description of a preferred embodiment thereof adapted for the splicing of tong chain, reference being had throughout the description to the accompanying drawing, in which:

Fig. 1 is a plan view showing two chain sections interconnected by the splicer;

Fig. 2 is a longitudinal section through the chain and splicer on line 2—2 of Fig. 1; and Fig. 3 is a perspective view of the splicer per se.

The typical form of chain sections 10 and 11 shown in the drawing, and of the type commonly used in pipe tongs in a manner well known to those familiar with the art, are comprised of the center bar links 12 interconnected by pins 13 with side bar links 14, the pins 13 projecting from the sides thereof as at 15. The splicer generally indicated at 16 comprises a preferably solid body 17 serving essentially as a link interconnecting chain sections 10 and 11, the body being centrally grooved at 18 at one end to take the center links 12 of chain section 10, and being attached thereto by pin 20 inserted through bores 21.

The body 17 is recessed at 22 to form a clevis to take the end of chain section 11, the width of recess 22 being slightly greater than the width of the chain, and its length preferably being sufficient to receive the end side bar links 14a. The sides 17a and 17b of the body are bridged at the bottom of recess 22 by a web 23, and the bottom face 24 of the recess preferably is shaped in accordance with the contour of links 14a. The web 23 preferably terminates short of the end of the body so as not to restrict free pivotal movement between the splicer and the adjacent chain link. Hook shaped grooves 25 are formed in the inner faces of sides 17a, 17b of the body, the shape of the grooves being such as to confine the chain pin 20b against removal, for instance upon upward movement of the chain about the splicer body in the position shown in Fig. 2. Although the chain sections may be spliced merely by virtue of the ends of the chain pin being confined within the grooves 25, and without the side links 14a being carried on the end of the chain, I find it preferable to insure the pin against backing out of the grooves while the chain is being used, and preferably though not necessarily by means of the outside links themselves, the body being shaped to confine the links 14a in such a manner that they serve to retain the pin in the grooves. It will be noted that the body at the closed end of recess 22 has a curved face 27 which serves as an abutment for links 14a to prevent removal of pin 20b from the side grooves, and consequently the links must be swung out of the recess before the pin can be backed out of the grooves. Thus the pin is held in place to prevent separation of the splicer and chain section 11, regardless of the position to which the chain may be swung about pin 20 relative to the splicer body, and the pull exerted by the chain.

In order to prevent the side links 14a from becoming swung out of the socket 22 while the chain is in use, I find it preferable to employ a suitable means for releasably retaining the side links in the socket. Such means may conveniently comprise a pair of leaf springs 30 secured to the curved end face 27 of the socket and adapted to bear against the ends of the links as shown in Fig. 2. As the side links are swung out of the socket to position 14b, springs 30 yield sufficiently to allow such movement.

In attaching the chain section 11 to the splicer, the link pin 20b is inserted within grooves 25 with the end side links swung to position 14b to permit insertion of the pin to the end of the grooves. The links then are swung into the central recess so as to prevent backing out movement of the pin within the side grooves, as described.

It may be mentioned that the present form of splicer may serve conveniently as a means for taking up the chain, since an intermediate as well as the end pin may be inserted and retained within the side grooves.

I claim:

1. A splicer link for chain in which the links are interconnected by projecting pins, comprising a body having a longitudinal recess formed therein, said recess having sufficient length to receive an entire chain link, there being formed within the body at the sides of said recess, hook-shaped grooves adapted to take the projecting ends of a chain pin, and means for preventing backing out movement of the pin within said grooves.

2. A splicer link for chain in which the links are interconnected by projecting pins, comprising a body having a longitudinal open end recess formed therein and adapted to receive the end link of a chain, and hook-shaped grooves being formed in the body within the sides of said recess and extending toward the open end thereof, and adapted to take the projecting ends of the chain pin connecting said link with the adjacent link, the end of said link being adapted to bear against the body at the end of said recess to prevent backing out movement of the pin within said grooves.

3. A device for splicing chain sections in which the links are interconnected by projecting pins, comprising a body having a bifurcated end adapted to receive the end of a chain link and provided with openings through which a chain pin may be inserted, said body having at its opposite end laterally spaced side portions within the inner faces of which are formed grooves to take the projecting ends of a chain pin.

4. In a device of the character described, the combination comprising a chain link, a single piece body having a longitudinal open end recess formed therein and containing said entire chain link, grooves for receiving the projecting ends of the pin connecting said link with the adjacent link, within the sides of said recess, there being a hole in one end of said body adapted to receive a chain pin.

JOHN D. CAMPBELL.